Oct. 25, 1949.
B. B. BAUER
2,486,099
PHONOGRAPH PICKUP HAVING FULCRUM SUSPENDED DRIVE ARM
Filed March 14, 1946
2 Sheets-Sheet 1
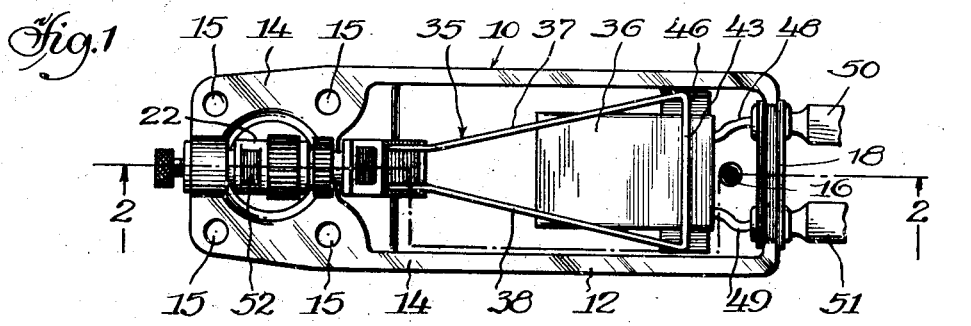
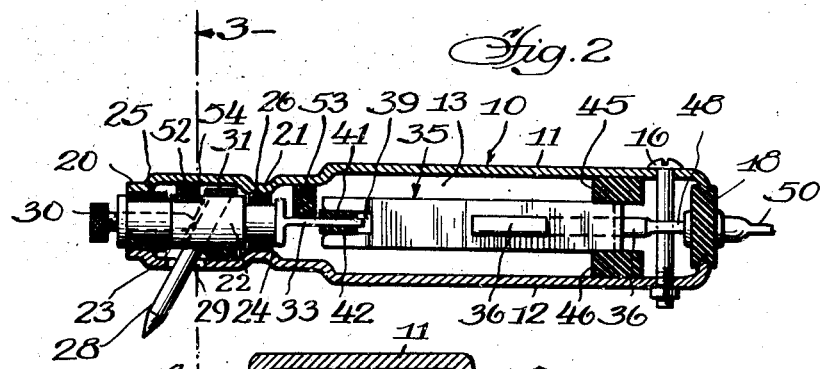
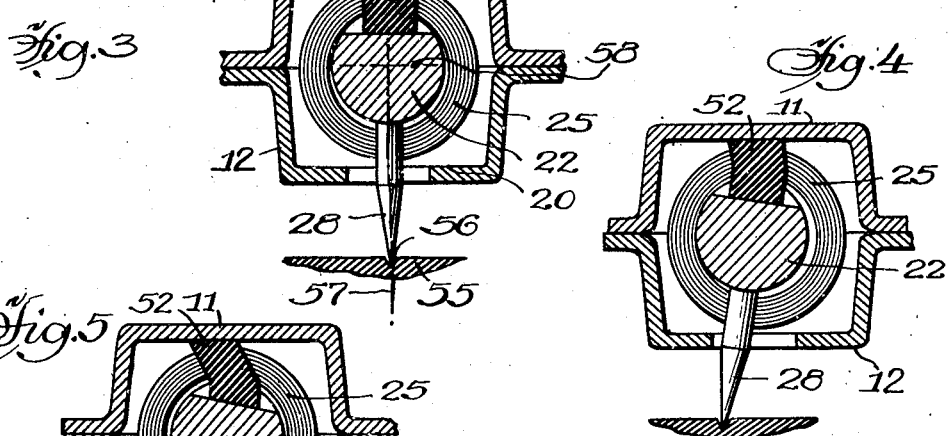
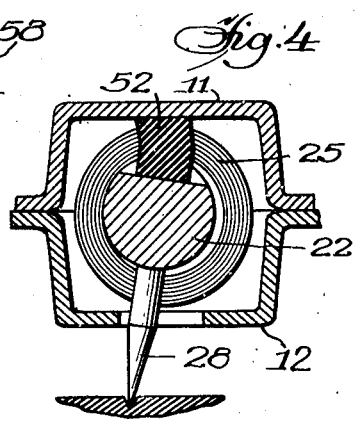
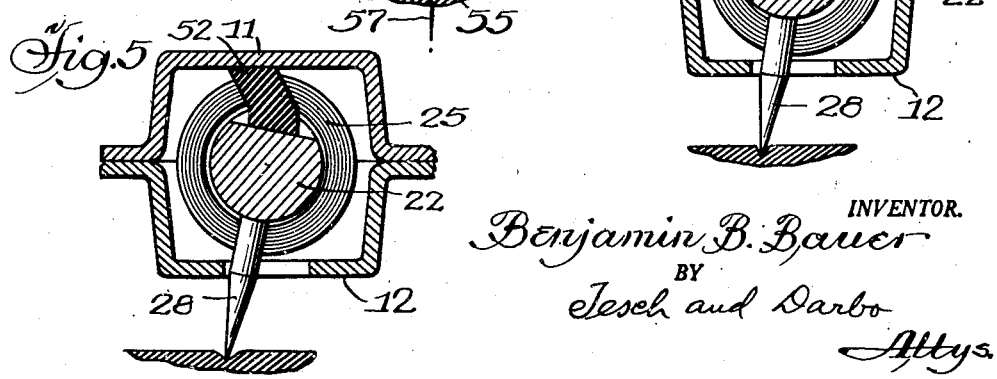
INVENTOR.
Benjamin B. Bauer
BY
Jesch and Darbo
Attys.

Oct. 25, 1949.

B. B. BAUER 2,486,099

PHONOGRAPH PICKUP HAVING FULCRUM SUSPENDED DRIVE ARM

Filed March 14, 1946

INVENTOR.
Benjamin B. Bauer,
BY
Jesch and Darbo
Attys.

Patented Oct. 25, 1949

2,486,099

UNITED STATES PATENT OFFICE 2,486,099

PHONOGRAPH PICKUP HAVING FULCRUM SUSPENDED DRIVE ARM

Benjamin B. Bauer, Oak Park, Ill., assignor, by mesne assignments, to Shure Brothers, Incorporated, Chicago, Ill., a corporation of Illinois Application March 14, 1946, Serial No. 654,471

8 Claims. (Cl. 179—100.41)

This invention relates to translating devices adapted for translating mechanical energy into electrical energy and vice versa, and particularly to translating devices of the torsion type, i. e., in which the translating element undergoes angular oscillation. It is directed especially to devices in which the direction of translation is from mechanical energy to electrical energy, such as phonograph reproducers, and the description will be directed specifically to such a device. However, the invention may also be used with devices in which translation is in the opposite direction, such as phonograph recorders.

More specifically, the invention relates to a translating device having a driving member which is mounted for angular oscillation and adapted to be moved by a stylus and to impart angular motion to the transducing element. In such devices, it is common practice to mount the driving member in a bearing member with soft rubber bushings under compression between the two members. The driving member undergoes angular oscillation relative to the bearing member and this is accompanied by a distortion of the material of the elastic rubber bushings. The rubber bushings possess a substantial amount of stiffness with the result that they exhibit resistance to distortion, and considerable impedance is offered by the stylus point to vibrational motion in response to the undulations of the record groove. Such impedance causes the stylus point to bear with relatively great pressure against the walls of the groove with the result that the record is worn and the fidelity of reproduction is impaired. If the compression upon the rubber bushings is relieved to reduce the impedance, the resulting system exhibits an undesired resonance at one or more frequencies within the operating range, which resonance disturbs the smoothness of the frequency response characteristic of the device.

It is an object of the present invention to provide a translating device of the general character described in which the impedance to vibration offered by the stylus point is relatively little, whereby a high degree of faithfulness of reproduction is realized and record wear is greatly reduced.

It is a further object of the invention to provide an improved translating device of the character described in which undesired resonances are effectively suppressed.

Other objects and advantages will become apparent as the following description progresses, which is to be taken in conjunction with the accompanying drawings in which:

Fig. 1 is a plan view of the translating device of the invention with the top half of the casing removed;

Fig. 2 is a vertical sectional view of the device along broken line 2—2 of Fig. 1;

Figs. 3, 4 and 5 are sectional views along line 3—3 of Fig. 2 with the device in different positions which it assumes during operation;

Figure 7:
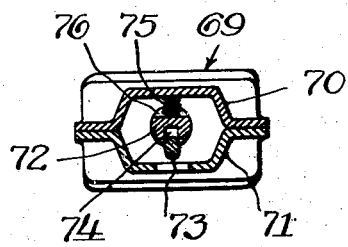
Figs. 7 and 8 are transverse sectional views of further embodiments of the invention.

Referring to Figs. 1 and 2, the device consists of a casing 10 which is composed of complementary top and bottom casing members 11 and 12, which may be composed of sheet metal or other suitable material and are dished to form a compartment 13 and have cooperating flanges 14 along the side edges thereof and adapted to abut together. At the forward end of the device, the casing members are held together by bolts (not shown) which pass through the openings 15 and at the rearward end by a bolt 16. At the rearward end, the casing members are turned inwardly toward each other and are shaped to provide an opening which is closed by a terminal block 18 of electrical insulating material, such as hard fiber, phenol formaldehyde resin, etc.

At the forward end and also at a point spaced inwardly from said end, the casing members are pressed inwardly to form generally circular bearing members 20 and 21, which support a generally cylindrical driving member 22 which is arranged with its longitudinal axis in substantial alignment with the longitudinal axis of the casing 10. At locations registering with the bearing members 20 and 21, the driving member 22 has circumferential recesses or trunnion sections 23 and 24. Between the recesses 23 and 24 and the bearing members 20 and 21 are arranged the bushings 25 and 26, which are composed of a soft, flexible, elastic material, such as natural or synthetic rubber or other elastomer. In accordance with the present invention, as will be explained hereinafter, the bushings 25 and 26 are under little or no pressure between the driving member 22 and the bearing members 20 and 21. The recesses 23 and 24 serve as trunnions and cooperate with the bushings 25 and 26 and bearing members 20 and 21 to support the driving member 22 in an angularly oscillatable manner.

A stylus 28 is received in a suitable opening in the driving member 22 and extends downwardly in a diagonal direction through a clearance opening 29 in the bottom casing member 12. The edges of the opening 29 may be arranged so as to limit the lateral excursion of the stylus beyond a predetermined amplitude. The stylus is clamped in position by a screw 30 which is screwed into a threaded opening extending into the driving member from the forward end thereof. A collar 31 of rubber or other elastic material encircles the driving member 22 and covers the upper end of the stylus-receiving opening and serves to limit the insertion of the stylus and as a cushion for the upper end of the stylus in case a blow is received upon the stylus point. The stylus illustrated is of the reproducing type, but a stylus of the recording type may be used as well, in which case it may extend perpendicularly, instead of diagonally, with respect to the driving member axis.

The driving member 22 has a flat blade section 33 at the rearward end thereof which cooperates with a yoke 35 of strip material to transmit angular oscillation from the driving member 22 to a transducing element which may be the piezoelectric crystal 36. The invention is not limited to use with a crystal type of transducing element, however, and may be used with other forms as well, such as the electromagnetic type of element. It may also be used with the electrostatic type of element illustrated in Figs. 6 and 7 of Patent No. 2,326,280, granted August 10, 1943. The means including the yoke 35 for transmitting oscillations from the driving member to the crystal are described and claimed in my copending application Serial No. 592,096, filed May 5, 1945. The yoke consists of a thin strip of resilient material, such as spring bronze, aluminum, etc. and is in the general shape of a V with the arms of the V spaced apart at the base and connected together at the top. The base of the V is arranged at the forward end of the yoke where the arms 37 and 38 thereof have forwardly opening slots one of which is the slot 39 shown in Fig. 2. The blade section 33 of the driving member is received in the said slots and thin pads 41 and 42 of elastic material, such as rubber, are arranged under pressure between the opposed surfaces of the blade and the yoke. The forward ends of the yoke arms are arranged on opposite sides of the axis of the driving member 22 respectively and the arms diverge rearwardly and are joined together at the rearward end by the transverse section 43 which is held in place by transverse blocks 45 and 56 which rest against the interior surfaces of the top and bottom casing members respectively. The blocks 45 and 46 are preferably composed of a firm elastic material, such as rubber or a synthetic elastomer, and are adapted to hold the rearward end of the yoke against any substantial motion. As an alternative, one of the blocks may be of a firm elastic material and the other of a rigid material, such as a phenol formaldehyde resin.

The rearward portion of the crystal 36 extends through an opening in the rearward section 43 of the yoke, and the forward corner portions extend through openings in the intermediate portions of the arms 37 and 38. An adhesive may be applied at these several points to fix the crystal in its relative position. The terminals 48 and 49 of the crystal are connected to the terminals 50 and 51 of the device, which are mounted in the terminal block 18.

When the device is being employed as a phonograph reproducer, with a record having a laterally cut groove, the point of the stylus 28 follows the undulations of the groove and undergoes vibration in a lateral direction, that is, in a direction transversely with respect to the axis of the driving member, and induces angular oscillation in the driving member 22. Such angular oscillation is transmitted by the blade section 33 to the forward end portions of the arms 37 and 38 of yoke 35 and induces vertical motion therein. At the same time the rearward end of the crystal is held firmly in position by the rearward yoke section 43 and the blocks 45 and 46. When the forward end of arm 37 is moved upwardly, the forward end of arm 38 is moved downwardly, and this motion is transmitted in a reduced degree to the forward corner portions of crystal 36, resulting in a twisting of the crystal which induces an electromotive force at the terminals thereof in a well known manner.

In devices known heretofore, the bushings between the driving member and the bearings, corresponding to the bushings 25 and 26, are under considerable pressure. For example, in a device having bushings of soft rubber having a Shore urometer A scale of hardness of approximately 40 to 50, in which the trunnions, corresponding to the recessed sections 23 and 24, have a nominal diameter of .140 inch and the cooperating bearings have a nominal internal diameter of .185 inch, the annular rubber bushings having a nominal thickness of .030 inch. The result is a reduction in thickness of the annulus of the bushings by compression equal to approximately .008 inch, under normal conditions, i. e., when the center line of the driving member 22 coincides with the center line of the bearing members 20 and 21, in which condition it is assumed that the reduction in thickness is uniform around the circumference of the bushings. When the term "normal conditions," or "normally," or a similar term, is used herein in the specification and claims, the said relationship is meant in which the center line of the driving member coincides with that of the bearing members, and the parts have nominal dimensions, i. e., dimensions which conform exactly to the design objective. However, it is not feasible in commercial production to attempt to adhere rigidly to such dimensions and tolerances must be provided in the thickness of the annular bushings, the radii of the reduced sections 23 and 24 and of the bearings 20 and 21. A cumulative tolerance of plus or minus .008 inch is provided for these dimensions, distributed among the thickness of the bushings, the radius of the trunnions and the radius of the bearings. Such variations in dimensions result in a range of reduction of thickness of the bushing annulus by compression equal to form .000 inch to .016 inch.

The bushings undergo distortion to permit the angular oscillation of the driving member with respect to the bearing members. The rubber bushings exhibit a relatively high ratio of stiffness to viscosity and offer considerable impedance to such distortion with the result that the stylus point offers correspondingly great impedance to lateral vibration and exerts a relatively great pressure against the walls of the record groove. As a consequence of this, the fidelity of reproduction is impaired and the record is subjected to undesirable wear. If an attempt is made to remedy the matter by reducing the compression upon the bushings, it has been found that the mass of the oscillating system and the compliance of the rubber bushings tend to set up resonance at one or more frequencies within the operating range with the result that the response frequency characteristic of the device is not uniform.

In accordance with the present invention, the soft rubber bushings 25 and 26 are under no compression and undergo no reduction in thickness under normal conditions, and an elastic combination fulcrum and damping member 52 is located between the driving member 22 and the casing 11. For example, with a bushing having a thickness of .030 inch and composed of soft rubber of the character described heretofore, the diameter of the reduced sections 22 and 23 is .140 inch and of the bearings 20 and 21 is .200 inch. Under these conditions and with the center line of the driving member coinciding with that of the bearings, the bushings exactly fill the spaces between the sections 22 and 23 and the bearings 20 and 21, and there is no compression upon the bushings. A cumulative tolerance of plus or minus .008 inch is provided, i. e., there may be a reduction in thickness of the bushing annulus, by compression, up to a maximum of .008 inch, or there may be a clearance between the bushing and the bearing, or between the bushing and the driving member, or on both sides of the bushing, having a total width of up to a maximum of .008 inch.

A recess 54 is provided in the upper portion of the driving member 22, between the recessed portions 23 and 24, said recess 54 preferably presenting a flat surface opposed to the interior surface of top casing member 11. The combination fulcrum and damping member 52 is located between and attached at its opposite ends to said opposed surfaces of recess 54 and casing member 11. The member 52 is arranged on the side of driving member 22 opposite to the side from which the stylus 28 projects. It may be composed of an elastomer, such as plasticized cellulose nitrate, polyvinyl acetate, or the copolymer of vinyl acetate and vinyl chloride, natural or artificial rubber, or they may be composed of felt, cork or other flexible elastic material. A damping member 53, which may be of similar composition, is arranged between and attached to the opposed surfaces of casing member 11 and a portion of the driving member 22 rearwardly of rearward trunnion section 24.

The members 52 and 53 may exert substantially no pressure against the driving member under normal conditions, or they may exert a slight pressure in a downward direction which is transmitted to the lower portions of the bushings 25 and 26.

The casing 10 is mounted upon a pickup tone arm (not shown) in the usual manner, and when the parts are in position with the stylus point resting upon the record the weight thereof is carried by the stylus and transmitted to the driving member with the result that the damping members 52 and 53 and the upper portions of the bushings 25 and 26 are under slight compression. The relative positions of the parts under such conditions are shown in Fig. 3. The record is indicated at 55 and the groove 56 thereof is directly beneath the center line of the driving member, indicated by the intersection of lines 57 and 58. The stylus, with respect to its lateral position, extends perpendicularly upright from the record and supports the driving member 22. The weight of the tone arm presses downwardly upon the casing 10 and compresses the fulcrum member 52 and the upper portion of the bushing 25, and also the damping member 53 and the upper portion of bushing 26 which are not seen in Fig. 3. The construction is preferably such that when the stylus is not resting upon the record, the fulcrum member 52 urges the forward end of the driving member to a position slightly lower than that shown in Fig. 3 in which the driving member is approximately centered within the bearing member 20. This is not critical, however, and the forward end of the driving member may be higher than is shown in Fig. 3 when the stylus rests upon the record. The clearance between the driving member and the bushing shown in Figs. 3, 4 and 5 is considerably exaggerated for clearness. In fact, in the position shown in Fig. 3, there normally is substantially no clearance and the illustration primarily emphasizes the loose association of the parts. Only little impedance is offered by bushings 25 and 26 to the angular oscillation of the driving member and correspondingly little impedance is offered by the stylus point against lateral vibration. The amount of shortening undergone by fulcrum member 52 due to compression may vary somewhat depending upon the choice of material for said member. The vertical position of the rearward end of the driving member is fixed more firmly than is that of the forward end because the damping member 53 and the yoke 35 resist vertical movement.

Fig. 4 illustrates the condition which exists when the stylus point has vibrated to the left in response to an undulation in the record groove 56 when the frequency of vibration is relatively low, i. e., less than 500 cycles per second. There is relatively little impedance against lateral motion of the driving member 22 as a whole and the latter swings bodily to the left with the fulcrum member 52 acting as a flexible pivot or fulcrum. At low frequency, therefore, the driving member 22, in addition to undergoing angular oscillation, vibrates laterally with the stylus, the axis of vibration being located somewhere within the body of the member 52, probably near the middle thereof. The member 52 readily undergoes the required bending and distortion because of its flexible elastic character. The lateral displacement of the damping member is small compared to that of the stylus tip and little energy is dissipated hence there is little damping. The loosely fitting bushing 25 permits the relatively free angular oscillation and lateral vibration of the driving member and serves principally as a soft bumper against the excursion of the driving member beyond a predetermined distance. These factors, together with the greater effective length of the moment arm, i. e., the distance between the stylus point and the axis of vibration, result in an impedance to lateral vibration of the stylus point which is of a low order of magnitude under low frequency operating conditions. The action at bushing 26 is similar to that at bushing 25 but the lateral translational motion is less because such motion is restrained by the forward ends of the arms 37 and 38. For this reason, it is not essential that bushing 26 be under substantially no compression, as is bushing 25. Bushing 26 may be under some compression, it having been found that the advantages of the invention are obtained if the forward bushing 25 is under substantially no compression and a flexible combination fulcrum and damping member, such as the member 52, is located forwardly of the rear bearing member, and preferably between the forward and rearward bearing members, whereby lateral motion of the forward end of the driving member freely takes place at low frequencies. The member 52 may also be located forwardly of the forward bearing member 20, if desired. In the structures known heretofore lateral motion of the drive rod is intentionally suppressed by placing the bushings under substantial pressure, in order that torsional displacement of the drive rod be as great as possible for a given amplitude of displacement of the stylus tip.

The action undergone by damping member 53 is different from that undergone by fulcrum member 52 because it joins the driving member at a point adjacent to the junction between the driving member and the yoke 35. Lateral motion at such point is restricted by the yoke and is principally rotational, so that there is little or no translation.

Fig. 5 illustrates the conditions which exist when the frequency of oscillation is high and the stylus point is swinging to the left in response to the undulations of the record groove 56. Under these conditions, the mass of the driving member provides sufficient inertia that any substantial lateral vibration thereof does not take place. The center line of the driving member remains substantially fixed and the driving member undergoes a more or less true angular oscillation. Again, the driving member oscillates relatively freely because of the loose fit between it and the bushing 25. The fulcrum member 52, however, undergoes relatively greater distortion for a given amplitude of motion of the stylus tip, since the amplitude of motion of the portion of the driving member attached to the damping member is much more nearly comparable to that of the stylus tip than it is at low frequencies. The end of the damping member attached to the driving member undergoes a back and forth lateral vibration, the member undergoing flexible distortion first in one direction and then in the other in so doing. It has been found that the synthetic elastomers, such as plasticized cellulose nitrate, polymerized vinyl acetate and the copolymer of vinyl acetate and vinyl chloride are admirably suited to provide the desired action because of their flexible elasticity and their relatively low ratio of stiffness to viscosity, which results in little impedance to vibration at low frequencies and yet provides the desired resistance and damping at high frequencies. As stated hereinbefore, natural or synthetic rubber, felt, cork, or the like may also be used for the fulcrum member 52, but they have been found to be less satisfactory because their ratio of stiffness to viscosity is higher than that of the preferred elastomers.

Another advantage afforded by the elastomers other than the rubber is that they inherently are damping materials. They have the property of recovering slowly from distortion. In other words, they possess a low degree of resilience. As a result, they do not tend to set up a natural resonance, and they damp any resonance set up by other elements. In fact, some of the more recent types of styli exhibit inherent tendencies to resonate, and the construction of the present invention effectively damps such resonance. As a result, the frequency response characteristic of the improved device of the present invention is uniform throughout the operating range. The construction of the invention, therefore, combines the advantages of low impedance to vibration at all frequencies and substantial freedom from resonance tendencies.

As has been described hereinbefore, the axis of oscillation of the system shifts with changing frequency. The shift is in a vertical direction, and there is no corresponding shift in the axis of the driving member 22. At the lowest frequencies, the axis of oscillation is at its upper point somewhere within the fulcrum member 52, and it shifts downwardly with increasing frequency until it reaches a point substantially coinciding with the axis of the driving member at the highest frequencies. As a result, the moment arm between the stylus point and the axis of oscillation is longer at the lower frequencies and shorter at the higher frequencies. The amplitude of oscillation of the driving member 22, therefore, for a given amplitude of vibration of the stylus point, varies with changing frequency, and is less at the lower frequencies and greater at the higher frequencies.

For a given amount of high frequency damping, the varying lever ratio provides increased high frequency response. This is desirable in transducers whose output is proportional to their angular displacement, such as piezoelectric crystals, since under the usual method of recording, these tend to provide deficient high frequency response. The invention provides the additional advantages that low torsional impedance is exhibited by the driving member, and the objectionable variations in such torsional impedance usually found in devices employing elastomer bushings is minimized in the present construction, since such bushings are under little or no pressure.

Figure 6:
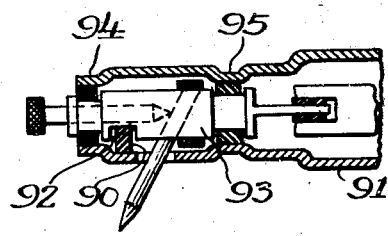
Fig. 6 is a fractional longitudinal sectional view of a different embodiment of the invention.

If desired, the combination fulcrum and damping member may be attached between the bottom of the driving member and the lower casing member 12, instead of between the top of the driving member and the upper casing member 11, in which case angular oscillation of the driving member will increase, instead of decrease, as the frequency becomes lower, for a given displacement of the stylus point. Such a construction is shown in Fig. 6, in which the construction and arrangement are the same as in the device of Figs. 1 and 2 except that fulcrum member 52 and recess 54 are omitted and a fulcrum member 90, similar to fulcrum member 52, is arranged between the interior surface of the bottom casing member 91 and the base of a recess 92 in the lower portion of the driving member 93, said recess being located between the forward and rearward bearing members 94 and 95 as shown. The fulcrum member 90 is attached at its ends by a suitable adhesive to the surfaces of casing member 91 and recess 92 respectively. The remainder of the parts are similar to the corresponding parts of the construction of Figs. 1 and 2.

The action undergone by the construction of Fig. 6 is similar to that described heretofore in connection with the device of Figs. 1 and 2 with the exception that at low frequencies the driving member 93 oscillates about an axis below, instead of above, its longitudinal axis. At high frequencies it oscillates about an axis which substantially coincides with its longitudinal axis in the same way as in the device of Figs. 1 and 2. Therefore, in the device of Fig. 6, the amplitude of oscillation of the driving member is greater at low frequencies than it is at high frequencies, for a given amplitude of oscillation of the stylus tip. This functional characteristic is opposite from that of the device of Figs. 1 and 2 in which the amplitude of oscillation of the driving member is less at low frequencies than it is at high frequencies, for a given amplitude of oscillation of the stylus tip. The described functional characteristic has especial advantage in pickups in which an electromagnetic type of transducing element is employed.

The fulcrum member may be in the form of a metal spring instead of the elastomer member 52 described heretofore. Such modification is illustrated in Fig. 7, in which all of the parts, except for the fulcrum member, are constructed and arranged similarly to the corresponding parts of the device of Figs. 1 and 2. The view shown in Fig. 7 is taken at the fulcrum member and looking rearwardly. The casing 69 is composed of top and bottom casing members 70 and 71 and contains the driving member 72. A spring 75 is arranged between the interior surface of top casing member 70 and recess 76 in the driving member, similar to recess 54 in driving member 22. Spring 75 may be secured to the casing and the driving member by soldering or welding and, when the stylus does not rest on the record, is preferably under neither compression nor tension, and acts as a fulcrum member for the driving member 22. The spring may, alternatively, be in the form of a substantially straight wire, if desired. The spring member does not provide the advantage of damping, and the combination fulcrum and damping member 52 is preferred, or separate damping means may be provided, as by arranging a piece of felt within the coils of the spring 75.

Figure 8:
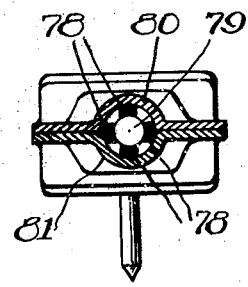

The forward bushing 25 may be replaced by a plurality of blocks or pads of flexible resilient material, such as rubber. Such construction is shown in Fig. 8 in which the view is taken through the forward bearing member and looking rearwardly. The construction of the casing and driving member is the same as shown in Figs. 1 and 2. A plurality of spaced apart pads 78 of soft rubber are arranged between the driving member 79 and the upper and lower casing members 80 and 81, and are preferably attached to the casing or the driving member by a suitable adhesive.

As another alternative, the bushing 25 may also be replaced by a bushing having a lesser thickness than that of bushing 25 and having circumferentially spaced projections extending inwardly therefrom into substantial contact with the driving member. The rearward bushing 26 may also be replaced by the two forms last described, if desired.

Figure 9:
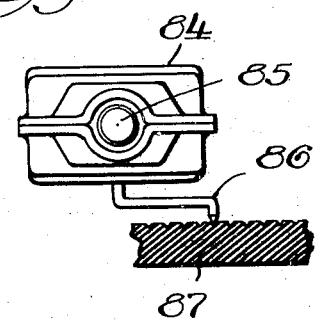
Figs. 9 and 10 are fractional end and side views, respectively, of a further embodiment of the invention.
Figure 10:
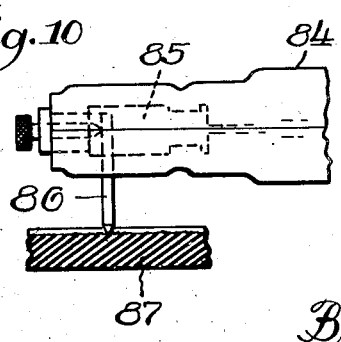

The modifications described heretofore are adapted for use with a record having a laterally cut groove. The modification shown in Figs. 9 and 10 is adapted for use with a vertically cut groove. The casing 84 and driving member 85 are constructed and arranged in a manner similar to casing 10 and driving member 22 of the device shown in Figs. 1 and 2, with the exception that the stylus receiving opening of the driving member extends substantially perpendicular, instead of diagonal, to the axis of the driving member. The stylus 86 is of angular shape, having an upper end portion which extends into the opening of the driving member 85, an intermediate portion which extends generally perpendicular to the upper end portion, and a tip portion which extends downwardly susbtantially perpendicular to the intermediate portion and makes contact with the record 87. The stylus is arranged so that its intermediate portion extends substantially perpendicular to the axis of the driving member 85, whereby when the tip portion vibrates vertically in response to the vertical undulations of the record groove, the upper end portion oscillates angularly, and induces angular oscillation in the driving member.

The construction and arrangement of the crystal and means for transmitting motion from the driving member to the crystal may be the same in the structures of Figs. 6 to 9 inclusive as in the device of Figs. 1 and 2.

As stated heretofore, the device of the invention may be employed as a recorder as well as a reproducer, in which case the driving member drives the stylus rather than the crystal.

What is claimed is:

1. In a mechano-electric transducer, the combination of a transducing element and a driving member engaged in motion-transmitting relationship with each other, forward and rearward bearing members supporting said driving member for angular oscillation about an axis, said driving member having means for engaging an arm extending from a side thereof and at an angle to said axis, flexible elastic bushings between said bearing members and said driving member, said bushings substantially filling the space between said bearing members and said driving member and being substantially uncompressed when said driver member is in the at rest position, whereby said driving member is adapted to undergo vibration in a transverse direction with respect to said axis, a flexible, elastic fulcrum member attached to said driving member between said bearing members and projecting from a side of said driving member generally opposite to said before-mentioned side thereof and in a direction transversely of said axis, and means for fixing said fulcrum member at a portion thereof spaced from said driving member.

2. In a mechano-electric transducer, the combination of a transducing element and a driving member engaged in motion-transmitting relationship with each other, said driving member being located forwardly of said transducing element, forward and rearward bearing members supporting said driving member for angular oscillation about an axis, said driving member having means for engaging an arm extending therefrom at an angle to said axis, flexible elastic bushing means between said bearing members and said driving member, the bushing means at said forward bearing member substantially filling the space between said bearing member and said driving member and being substantially uncompressed when said driving member is in the at rest position whereby said driving member is adapted to undergo vibration in a transverse direction with respect to said axis, a flexible elastic fulcrum member attached to said driving member at a location forwardly of said rearward bearing and projecting from said driving member in a direction transversely of said axis, and means for fixing said fulcrum member at a portion thereof spaced from said driving member.

3. In a mechano-electric transducer, the combination of a transducing element and a driving member engaged in motion-transmitting relationship with each other, said driving member being located forwardly of said transducing element, forward and rearward bearing members supporting and driving member for angular oscillation about an axis, said driving member having means for engaging an arm extending therefrom at an angle to said axis, the forward bearing member being of flexible elastic composition and making loose engagement with said driving member whereby said driving member is adapted to undergo vibration in a transverse direction with respect to said axis, a flexible elastic fulcrum member attached to said driving member at a location forwardly of said rearward bearing and projecting from said driving member in a direction transversely of said axis, and means for fixing said fulcrum member at a portion thereof spaced from said driving member.

4. A transducer construction as claimed in claim 3 in which the fulcrum member is composed of an elastomer having the property of slow recovery from deformation.

5. A transducer construction as claimed in claim 3 in which the forward bearing member is composed of an elastomer.

6. In a mechano-electric transducer, the combination of a transducing element and a driving member engaged in motion-transmitting relationship with each other, a bearing member supporting said driving member for angular oscillation about an axis, said driving member having means for engaging an arm extending from a location thereon and in a direction at an angle to said axis, flexible elastic bushing means between said bearing number and said driving member, said bushing means substantially filling the space between said bearing members and said driving member and being substantially uncompressed when said driving member is in the at rest position, whereby said driving member is adapted to undergo vibration in a transverse direction with respect to said axis, a flexible fulcrum member attached to said driving member and projecting therefrom in a transverse direction with respect to said axis, the location of said fulcrum member axially of said driving member being in closer proximity to said before-mentioned location on said driving member than is said bushing means, and means for fixing said fulcrum member at a portion thereof spaced from said driving member.

7. In a mechano-electric transducer, the combination of a transducing element and a driving member engaged in motion-transmitting relationship with each other, a flexible elastic bearing member supporting said driving member for angular oscillation about an axis, said driving member having means for engaging an arm extending from a location thereon and in a direction at an angle to said axis, said bearing member having sufficient flexibility to permit transverse vibration of said driving member with respect to said axis, a flexible fulcrum member attached to said driving member and projecting from said driving member in a direction transversely of said axis and from a location longitudinally of said axis generally coinciding with said before-mentioned location, and means for fixing said fulcrum member at a portion thereof spaced from said driving member.

8. In a mechano-electric transducer, the combination of a transducing element and a driving member engaged in motion-transmitting relationship with each other, a flexible elastic bearing member supporting said driving member for angular oscillation about an axis, said driving member having means for engaging an arm extending from a location thereon and in a direction at an angle to said axis, said bearing member fitting uncompressed about said driving member whereby said driving member is adapted to undergo vibration in a transverse direction with respect to said axis, a flexible fulcrum member attached to said driving member and projecting therefrom transversely of said axis and at a location generally opposite to said before-mentioned location, and means for fixing said fulcrum member at a portion thereof spaced from said driving member.

BENJAMIN B. BAUER.

REFERENCES CITED

The following references are of record in the file of this patent:

UNITED STATES PATENTS

| Number | Name | Date |
| --- | --- | --- |
| 2,092,884 | Kendall | Sept. 14, 1937 |
| 2,155,469 | Burt | Apr. 25, 1939 |
| 2,313,126 | Dally | Mar. 9, 1943 |
| 2,348,526 | Dally | May 9, 1944 |
| 2,451,221 | Hutter | Oct. 21, 1948 |